(12) United States Patent
Bailey et al.

(10) Patent No.: US 7,617,205 B2
(45) Date of Patent: Nov. 10, 2009

(54) ESTIMATING CONFIDENCE FOR QUERY REVISION MODELS

(75) Inventors: David R. Bailey, Palo Alto, CA (US); Alexis J. Battle, Redwood City, CA (US); Benedict A. Gomes, Mountain View, CA (US); P. Pandurang Nayak, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 766 days.

(21) Appl. No.: 11/096,198

(22) Filed: Mar. 30, 2005

(65) Prior Publication Data

US 2006/0230035 A1    Oct. 12, 2006

(51) Int. Cl.
G06F 17/30    (2006.01)
(52) U.S. Cl. .................................. 707/5; 707/2; 707/4
(58) Field of Classification Search ........................ None
See application file for complete search history.

(56) References Cited

U.S. PATENT DOCUMENTS

| | | | |
|---|---|---|---|
| 5,826,260 A | 10/1998 | Byrd et al. | |
| 6,006,221 A | 12/1999 | Liddy et al. | |
| 6,285,999 B1 | 9/2001 | Page | |
| 6,519,585 B1 | 2/2003 | Kohli | |
| 6,651,054 B1 | 11/2003 | de Judicibus | |
| 6,671,711 B1 | 12/2003 | Pirolli et al. | |
| 6,675,159 B1 | 1/2004 | Lin et al. | |
| 6,701,309 B1 | 3/2004 | Beeferman et al. | |
| 6,718,363 B1 | 4/2004 | Ponte | |
| 6,732,088 B1 | 5/2004 | Glance | |
| 6,751,611 B2 | 6/2004 | Krupin et al. | |
| 6,772,150 B1 * | 8/2004 | Whitman et al. ............... | 707/5 |
| 6,829,599 B2 | 12/2004 | Chidlovskii | |
| 6,856,957 B1 | 2/2005 | Durmonlin | |
| 7,031,961 B2 | 4/2006 | Pitkow et al. | |
| 2002/0002438 A1 | 1/2002 | Ohmura et al. | |
| 2003/0014399 A1 | 1/2003 | Hansen et al. | |
| 2003/0093408 A1 | 5/2003 | Brown et al. | |
| 2003/0135413 A1 | 7/2003 | Nishi et al. | |
| 2003/0144994 A1 * | 7/2003 | Wen et al. ..................... | 707/3 |
| 2003/0210666 A1 | 11/2003 | Trossen et al. | |

(Continued)

OTHER PUBLICATIONS

"How the Vivisimo Clustering Engine Works", Vivisimo, Inc., 2003, 2 pages.
Jaczynski, M. et al., "Broadway: A Case-Based System for Cooperative Information Browsing on the World-Wide-Web," INRIA Sophia-Antipolis, Action AID, 12 pages.
Chang, D. T., "HieNet: A User-Centered Approach for Automatic Link Generation," ACM, Hypertext '93 Proceedings, Nov. 1993, pp. 145-158.

(Continued)

Primary Examiner—Tim T. Vo
Assistant Examiner—Jau-Shya Meng
(74) Attorney, Agent, or Firm—Fish & Richardson P.C.

(57) ABSTRACT

An information retrieval system includes a query revision architecture that integrates multiple different query revisers, each implementing one or more query revision strategies. A revision server receives a user's query, and interfaces with the various query revisers, each of which generates one or more potential revised queries. The revision server evaluates the potential revised queries, and selects one or more of them to provide to the user. A session-based reviser suggests one or more revised queries, given a first query, by calculating an expected utility for the revised query. The expected utility is calculated as the product of a frequency of occurrence of the query pair and an increase in quality of the revised query over the first query.

17 Claims, 4 Drawing Sheets

U.S. PATENT DOCUMENTS

| | | | |
|---|---|---|---|
| 2003/0212666 A1 | 11/2003 | Basu et al. | |
| 2003/0217052 A1 | 11/2003 | Rubenczyk et al. | |
| 2004/0083211 A1 | 4/2004 | Bradford | |
| 2004/0186827 A1 | 9/2004 | Anich et al. | |
| 2004/0199419 A1 | 10/2004 | Kim et al. | |
| 2004/0199498 A1 | 10/2004 | Kapur et al. | |
| 2004/0236721 A1* | 11/2004 | Pollack et al. | 707/2 |
| 2004/0254920 A1* | 12/2004 | Brill et al. | 707/3 |
| 2005/0027691 A1 | 2/2005 | Brin et al. | |
| 2005/0044224 A1 | 2/2005 | Jun et al. | |
| 2005/0071337 A1 | 3/2005 | Baranczyk et al. | |
| 2005/0125215 A1 | 6/2005 | Wu et al. | |
| 2005/0149499 A1 | 7/2005 | Franz et al. | |
| 2005/0198068 A1 | 9/2005 | Mukherjee et al. | |
| 2005/0256848 A1 | 11/2005 | Alpert et al. | |
| 2006/0026013 A1* | 2/2006 | Kraft | 705/1 |
| 2006/0031214 A1 | 2/2006 | Solaro et al. | |
| 2006/0041560 A1 | 2/2006 | Forman et al. | |
| 2006/0074883 A1 | 4/2006 | Teevan et al. | |
| 2006/0218475 A1* | 9/2006 | Bodin et al. | 715/500 |
| 2007/0100804 A1 | 5/2007 | Cava | |
| 2007/0106937 A1 | 5/2007 | Cucerzan et al. | |

OTHER PUBLICATIONS

U.S. Appl. No. 11/096,726, filed Mar. 30, 2005, Lamping et al.
U.S. Appl. No. 11/090,302, filed Mar. 28, 2005, Lamping et al.
U.S. Appl. No. 10/900,021, filed Jul. 26, 2004, Patterson.
U.S. Appl. No. 10/878,926, filed Jun. 28, 2004, Battle et al.
U.S. Appl. No. 10/734,584, filed Dec. 15, 2003, Bern et al.
U.S. Appl. No. 10/676,571, filed Sep. 30, 2003, Harik et al.
U.S. Appl. No. 10/668,721, filed Sep. 22, 2003, Haahr et al.
PCT International Search Report and Written Opinion, PCT/US05/10681, Oct. 18, 2006, 7 pages.
PCT International Search Report and Written Opinion, PCT/US06/09076, Sep. 20, 2007, 8 pages.
Cui, Hang et al., "Probabilistic Query Expansion Using Query Logs", Proceedings of the 11th International Conference on the World Wide Web, May 7-11, 2002, Honolulu, HI, 8 pages.
Boyan, J.A. et al., "Learning Evaluation Functions for Global Optimization and Boolean Satisfiability," 1998, [online] Retrieved from the Internet <URL:http://www.autonlab.org/autonweb/14682/version/2/part/5/data/boyanlearning.pdf?branch=main&language=en>.

* cited by examiner

ESTIMATING CONFIDENCE FOR QUERY REVISION MODELS

CROSS REFERENCE TO RELATED APPLICATION

This application is related to:

U.S. patent application Ser. No. 10/668,721, filed on Sep. 22, 2003, entitled "System and Method for Providing Search Query Refinements;"

U.S. application Ser. No. 10/676,571, filed on Sep. 30, 2003, entitled "Method and Apparatus for Characterizing Documents Based on Clusters of Related Words;"

U.S. application Ser. No. 10/734,584, filed Dec. 15, 2003, entitled "Large Scale Machine Learning Systems and Methods;"

U.S. application Ser. No. 10/878,926, "Systems and Methods for Deriving and Using an Interaction Profile," filed on Jun. 28, 2004;"

U.S. application Ser. No. 10/900,021, filed Jul. 26, 2004, entitled "Phrase Identification in an Information Retrieval System;"

U.S. application Ser. No. 11/090,302, filed Mar, 28, 2005, entitled "Determining Query Terms of Little Significance;"

U.S. Application Ser. No. 11/096,726, filed on Mar. 30, 2005, entitled "Determining Query Term Synonyms Within Query Context;" and U.S. Pat. No. 6,285,999; each of which is incorporated herein by reference.

FIELD OF INVENTION

The present invention relates to information retrieval systems generally, and more particularly to system architectures for revising user queries.

BACKGROUND OF INVENTION

Information retrieval systems, as exemplified by Internet search engines, are generally capable of quickly providing documents that are generally relevant to a user's query. Search engines may use a variety of statistical measures of term and document frequency, along with linkages between documents and between terms to determine the relevance of document to a query. A key technical assumption underlying most search engine designs is that a user query accurately represents the user's desired information goal.

In fact, users typically have difficulty formulating good queries. Often, a single query does not provide desired results, and users frequently enter a number of different queries about the same topic. These multiple queries will typically include variations in the breadth or specificity of the query terms, guessed names of entities, variations in the order of the words, the number of words, and so forth. Because different users have widely varying abilities to successfully revise their queries, various automated methods of query revision have been proposed.

Most commonly, query refinement is used to automatically generate more precise (i.e., narrower) queries from a more general query. Query refinement is primarily useful when users enter over-broad queries whose top results include a superset of documents related to the user's information needs. For example, a user wanting information on the Mitsubishi Galant automobile might enter the query "Mitsubishi," which is overly broad, as the results will cover the many different Mitsubishi companies, not merely the automobile company. Thus, refining the query would be desirable (though difficult here because of the lack of additional context to determine the specific information need of the user).

However, query refinement is not useful when users enter overly specific queries, where the right revision is to broaden the query, or when the top results are unrelated to the user's information needs. For example, the query "Mitsubishi Galant information" might lead to poor results (in this case, too few results about the Mistubishi Galant automobile) because of the term "information." In this case, the right revision is to broaden the query to "Mitsubishi Galant." Thus, while query refinement works in some situations, there are a large number of situations where a user's information needs are best met by using other query revision techniques.

Another query revision strategy uses synonym lists or thesauruses to expand the query to capture a user's potential information need. As with query refinement, however, query expansion is not always the appropriate way to revise the query, and the quality of the results is very dependent on the context of the query terms.

Because no one query revision technique can provide the desired results in every instance, it is desirable to have a methodology that provides a number of different query revision methods (or strategies).

SUMMARY OF THE INVENTION

An information retrieval system includes a query revision architecture that provides a number of different query revisers, each of which implements its own query revision strategy. Each query reviser evaluates a user query to determine one or more potential revised queries of the user query. A revision server interacts with the query revisers to obtain the potential revised queries. The revision server also interacts with a search engine in the information retrieval system to obtain for each potential revised query a set of search results. The revision server selects one or more of the revised queries for presentation to the user, along with a subset of search results for each of the selected revised queries. The user is thus able to observe the quality of the search results for the revised queries, and then select one of the revised queries to obtain a full set of search results for the revised query.

A system and method use session-based user data to more correctly capture a user's potential information need based on analysis of changes other users have made in the past. To accomplish this, revised queries are provided based on click data collected from many individual user sessions.

In one embodiment, a session-based reviser suggests one or more revised queries based on an expected utility for the revised queries from the user session click data. Using this data, the expected utility is determined by tracking the frequency with which an original query is replaced with a revised query and estimating the improvement in quality for the revised query over the original query. Then, the expected utility data is used to rank the possible revised queries to decide which revisions most likely capture the user's potential information need.

The present invention is next described with respect to various figures, diagrams, and technical information. The figures depict various embodiments of the present invention for purposes of illustration only. One skilled in the art will readily recognize from the following discussion that alternative embodiments of the illustrated and described structures,

DETAILED DESCRIPTION

System Overview

Figure 1A:
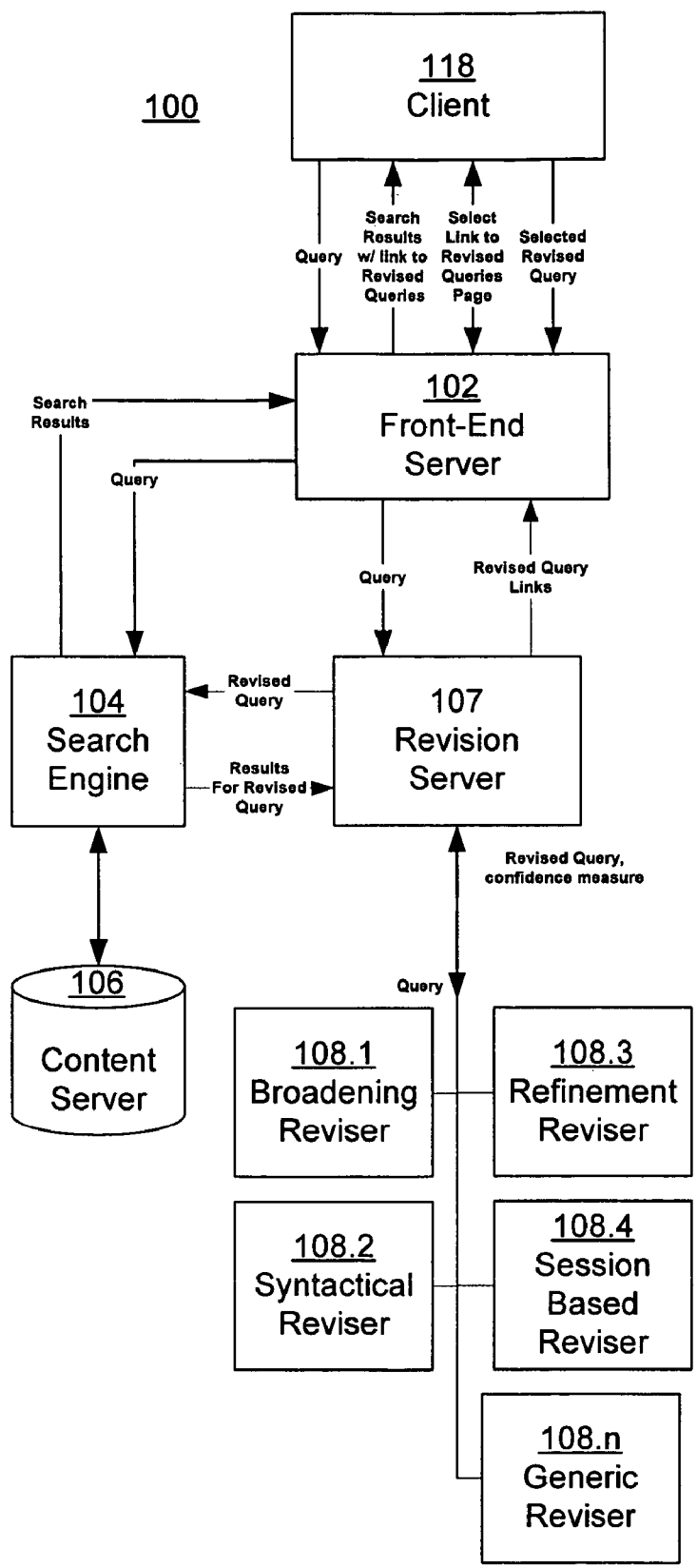
FIG. 1a is an overall system diagram of an embodiment of an information retrieval system providing for query revision.

FIG. 1a illustrates a system 100 in accordance with one embodiment of the present invention. System 100 comprises a front-end server 102, a search engine 104 and associated content server 106, a revision server 107, and a number of query revisers 108. During operation, a user accesses the system 100 via a conventional client 118 over a network (such as the Internet, not shown) operating on any type of client computing device, for example, executing a browser application or other application adapted to communicate over Internet related protocols (e.g., TCP/IP and HTTP). While only a single client 118 is shown, the system 100 can support a large number of concurrent sessions with many clients. In one implementation, the system 100 operates on high performance server class computers, and the client device 118 can be any type of computing device. The details of the hardware aspects of server and client computers is well known to those of skill in the art and is not further described here.

The front-end server 102 is responsible for receiving a search query submitted by the client 118. The front-end server 102 provides the query to the search engine 104, which evaluates the query to retrieve a set of search results in accordance with the search query, and returns the results to the front-end server 102. The search engine 104 communicates with one or more of the content servers 106 to select a plurality of documents that are relevant to user's search query. A content server 106 stores a large number of documents indexed (and/or retrieved) from different websites. Alternately, or in addition, the content server 106 stores an index of documents stored on various websites. "Documents" are understood here to be any form of indexable content, including textual documents in any text or graphics format, images, video, audio, multimedia, presentations, web pages (which can include embedded hyperlinks and other metadata, and/or programs, e.g., in Javascript), and so forth. In one embodiment, each indexed document is assigned a page rank according to the document's link structure. The page rank serves as a query independent measure of the document's importance. An exemplary form of page rank is described in U.S. Pat. No. 6,285,999, which is incorporated herein by reference. The search engine 104 assigns a score to each document based on the document's page rank (and/or other query-independent measures of the document's importance), as well as one or more query-dependent signals of the document's importance (e.g., the location and frequency of the search terms in the document).

The front-end server 102 also provides the query to the revision server 107. The revision server 107 interfaces with a number of different query revisers 108, each of which implements a different query revision strategy or set of strategies. In one embodiment, the query revisers 108 include: a broadening reviser 108.1, a syntactical reviser 108.2, a refinement reviser 108.3, and a session-based reviser 108.4. The revision server 107 provides the query to each reviser 108, and obtains in response from each reviser 108 one or more potential revised queries (called 'potential' here, since they have not been adopted at this point by the revision server 107). The system architecture is specifically designed to allow any number of different query revisers 108 to be used, for poor performing query revisers 108 to be removed, and for new query revisers 108 (indicated by generic reviser 108.n) to be added as desired in the future. This gives the system 100 particular flexibility, and also enables it to be customized and adapted for specific subject matter domains (e.g., revisers for use in domains like medicine, law, etc.), enterprises (revisers specific to particular business fields or corporate domains, for internal information retrieval systems), or for different languages (e.g., revisers for specific languages and dialects).

Preferably, each revised query is associated with a confidence measure representing the probability that the revision is a good revision, i.e., that the revised query will produce results more relevant to the user's information needs than the original query. Thus, each potential revised query can be represented by the tuple $(R_i, C_i)$, where R is a potential revised query, and C is the confidence measure associated with the revised query. In one embodiment, these confidence measures are manually estimated beforehand for each revision strategy of each reviser 108. The measures can be derived from analysis of the results of sample queries and revised queries under test. For example, the refinement reviser 108.3 can assign a high confidence measure to revised queries from an original short query (e.g., three or less terms), and a low confidence measure to revised queries from an original long query (four or more terms). These assignments are based on empirical evaluations that show that adding terms to short queries tends to significantly improve the relevance of the queries with respect to the underlying information need (i.e., short queries are likely to be over broad, and refinements of such queries are likely to focus on narrower and more relevant result sets). Conversely, the broadening reviser 108.1 can assign a high confidence measure to revised queries that drop one or more terms from, or add synonyms to, a long query. In other embodiments, one or more of the revisers 108 may dynamically generate a confidence measure (e.g., at run time) for one or more of its potential revised queries. Such an embodiment is further described below in conjunction with FIG. 1b. The assignment of confidence measures may be performed by other components (e.g., the revision server 107), and may take into account both query-dependent and query-independent data.

The revision server 107 can select one or more (or all) of the potential revised queries, and provide these to the search engine 104. The search engine 104 processes a revised query in the same manner as normal queries, and provides the results of each submitted revised query to the revision server 107. The revision server 107 evaluates the results of each revised query, including comparing the results for the revised query with the results for the original query. The revision server 107 can then select one or more of the revised queries as being the best revised queries (or at least revised queries that are well-suited for the original query), as described below.

The revision server 107 receives all of the potential revised queries R, and sorts them by their associated confidence measures C, from highest to lowest confidence. The revision server 107 iterates through the sorted list of potential revised queries, and passes each potential revised query to the search engine 104 to obtain a set of search results. (Alternatively, the revision server 107 may first select a subset of the potential revised queries, e.g., those with a confidence measure above a threshold level). In some cases the top search results may already have been fetched (e.g., by a reviser 108 or the revision server 107) while executing a revision strategy or in estimating confidence measures, in which case the revision server 107 can use the search results so obtained.

For each potential revised query, the revision server 107 decides whether to select the potential revised query or discard it. The selection can depend on an evaluation of the top N search results for the revised query, both independently and with respect to the search results of the original query. Generally, a revised query should produce search results that are more likely to accurately reflect the user's information needs than the original query. Typically the top ten results are evaluated, though more or less results can be processed, as desired.

Figure 3:
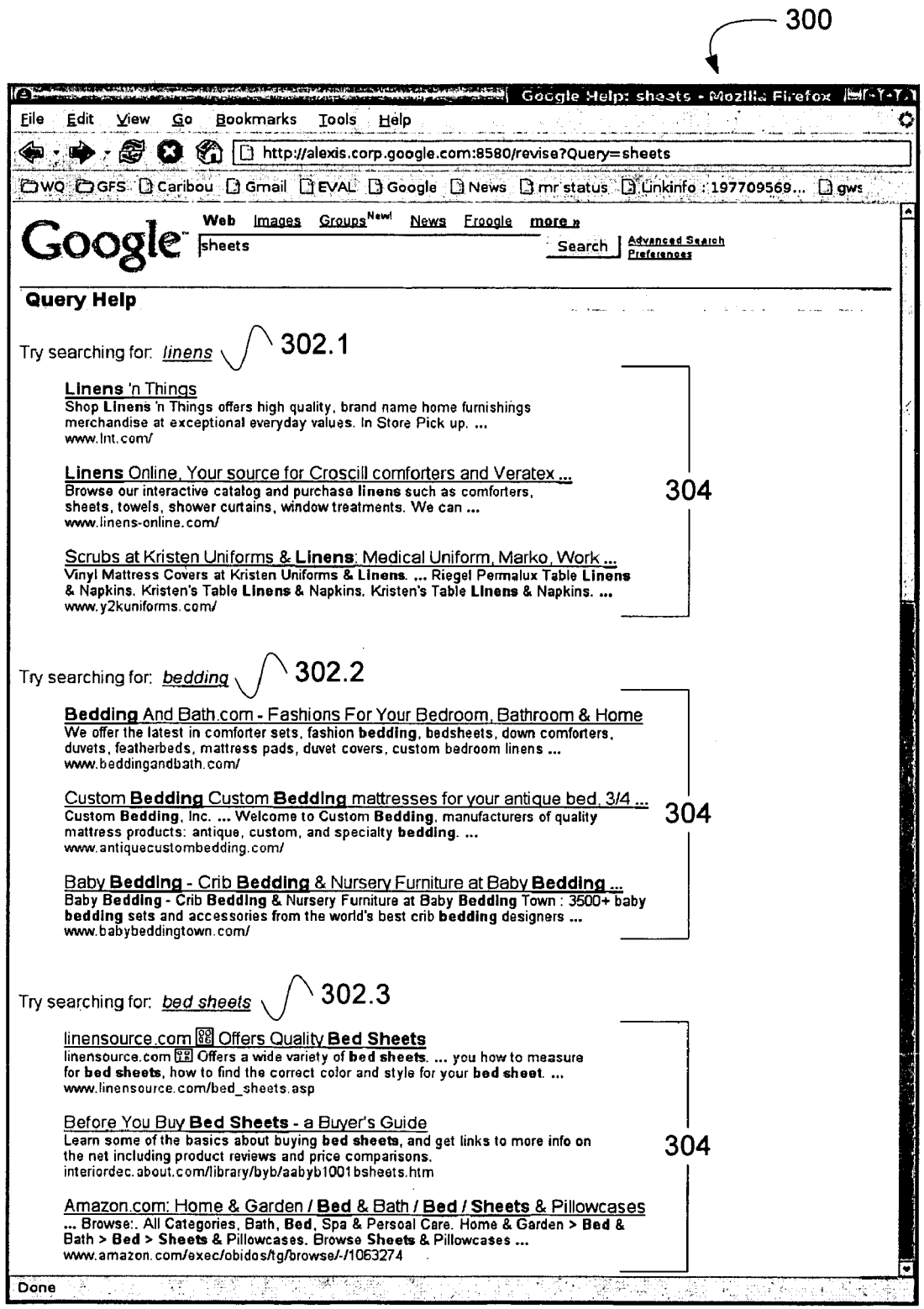
FIG. 3 is an illustration of a sample revised queries page.

In one embodiment, a potential revised query is selected if the following conditions holds:

i) The revised query produces at least a minimum number of search results. For example, setting this parameter to 1 will discard all (and only) revisions with no search results. The general range of an acceptable minimum number of results is 1 to 100.

ii) The revised query produces a minimum number of "new" results in a revision's top results. A result is "new" when it does not also occur in the top results of the original query or a previously selected revised query. For example, setting this parameter to 2 would require each selected revision to have at least two top results that do not occur in the top results of any previously selected revised query or in the top results of the original query. This constraint ensures that there is a diversity of results in the selected revisions, maximizing the chance that at least one of the revisions will prove to be useful. For example, as can be seen in FIG. 3, the top three results 304 for each revised query are distinct from the other result sets. This gives the user a broad survey of search results that are highly relevant to the revised queries.

iii) A maximum number of revised queries have not yet been selected. In other words, when a maximum number of revised queries have already been selected, then all remaining revised queries are discarded. In one embodiment, the maximum number of revised queries is set at 4. In another embodiment, the maximum number of revised queries is set between 2 and 10.

The results of the foregoing selection parameters are a set of selected revised queries that will be included on the revised queries page 300. The revision server 107 constructs a link to this page, and provides this link to the front-end server 102, as previously discussed. The revision server 107 determines the order and layout of the revised queries on the revised queries page 300. The revised queries are preferably listed in order of their confidence measures (from highest to lowest).

The front-end server 102 includes the provided links in a search results page, which is then transmitted to the client 118. The user can then review the search results to the original query, or select the link to the revised queries page, and thereby view the selected revised queries and their associated results.

Presentation of Revised Queries

Figure 2:
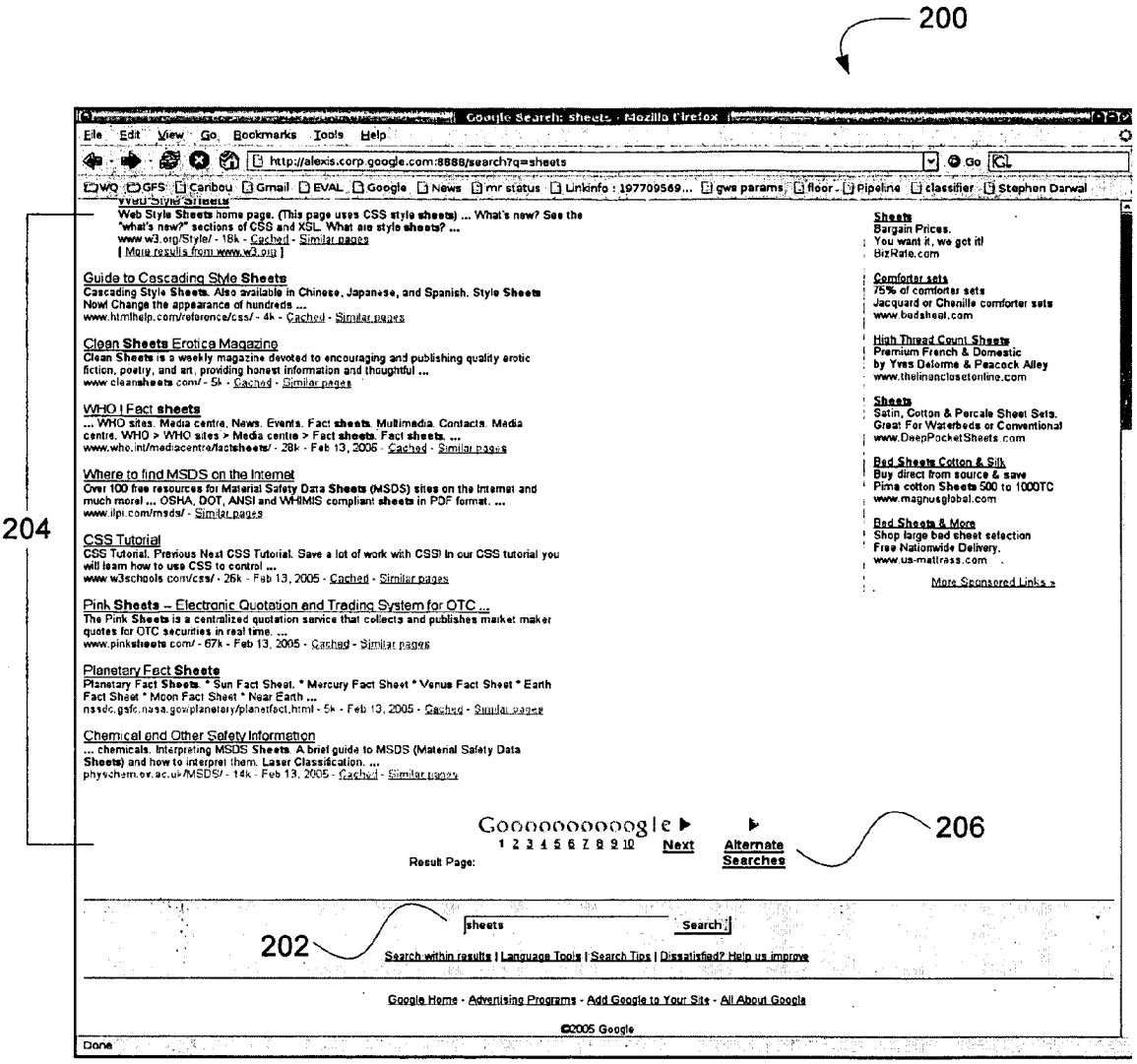
FIG. 2 is an illustration of a sample results page to an original user query.

FIG. 2 illustrates a sample results page 200 provided to a client 118. In this simple implementation, the search results 200 page includes the original query 202 of [sheets] along with the results 204 to this query. A link 206 to a set of revised queries is included at the bottom of the page 200. The user can then click on the link 206, and access the page of revised queries. An example page 300 is shown in FIG. 3. Here, the top three revised queries are presented, as shown by revised query links 302.1, 302.2, and 302.3 for the revised queries of [linens], [bedding], and [bed sheets], respectively. Below each revised query link 302 are the top three search results 304 for that query.

There are various benefits to providing the revised queries on a separate page 300 from the original results page 200. First, screen area is a limited resource, and thus listing the revised queries by themselves (without a preview of their associated results), while possible, is less desirable because the user does not see revised queries in the context of their results. By placing the revised queries on a separate page 300, the user can see the best revised queries and their associated top results, enabling the user to choose which revised query appears to best meet their information needs, before selecting the revised query itself. While it would be possible to include both the results of the original query and the revised queries on a single (albeit long) page, this approach would either require to the user to scroll down the page to review all of the revised queries, or would clutter the initially visible portion of the page. Instead, in the preferred embodiment illustrated in FIGS. 2 and 3, the user can see results associated with query revisions, click on each revised query link 302, and access the entire set of search results for the selected revised query. In many cases this approach will also be preferable to automatically using the revised queries to obtain search results and automatically presenting them to the user (e.g., without user selection or interaction). In addition, this approach has the added benefit of indirectly teaching the user how to create better queries, by showing the best potential revisions. In another embodiment, the revision server 107 can force the query revisions to be shown on the original result page 200, for example, in a separate window or within the original result page 200.

The method of displaying additional information (e.g., search results 304), about query revisions to help users better understand the revisions can also be used on the main results page 200. This is particularly useful when there is a single very high quality revised query (or a small number of very high quality revisions) such as is the case with revisions that correct spellings. Spell corrected revised queries can be shown on the results page 200, along with additional information such as title, URL, and snippet of the top results to help the user in determining whether or not the spell correction suggestion is a good one.

In another embodiment, revision server 107 uses the confidence measures to determine whether to show query revisions at all, and if so, how prominently to place the revisions or the link thereto. This embodiment is discussed below.

Query Revisers

Referring again to FIG. 1, various query revisers 108 are now described. The broadening reviser 108.1 generates one or more revised queries that effectively broaden the scope of the original query. These revisions are particularly useful where the original query is overly narrow. There are several different strategies that can be used by the broadening reviser 108.1.

First, this reviser 108.1 can broaden the query by adding synonyms and related terms as disjuncts. Queries are often overly specific because the user happens to choose a particular word to describe a general concept. If the documents of interest do not contain the word, the user's information need remains unfulfilled. Query revisions that add synonyms as disjuncts can broaden the query and bring the desired documents into the result set. Similarly, it is sometimes helpful to add a related word, rather than an actual synonym, as a disjunct. Any suitable method of query broadening, such as related terms, synonyms, thesauruses or dictionaries, or the like may be used here. One method for query broadening is disclosed in U.S. application Ser. No. 11/096,726, filed on Mar. 30, 2005, entitled "Determining Query Term Synonyms Within Query Context," which is incorporated by reference.

Second, this reviser 108.1 can broaden the query by dropping one or more query terms. As an earlier example showed, sometimes dropping a query term (like "information" in the example query "Mitsubishi Gallant information") can result in a good query revision. In this approach, the broadening reviser 108.1 determines which terms of the query are unimportant in that their presence does not significantly improve the search results as compared to their absence. Techniques for identifying unimportant terms for purposes of search are described in U.S. application Ser. No. 11/090,302, filed Mar. 28, 2005, entitled "Determining Query Terms of Little Significance," which is incorporated by reference. The results of such techniques can be used to revise queries by dropping unimportant terms.

The syntactical reviser 108.2 can revise queries by making various types of syntactic changes to the original query. These include the following revision strategies:

Remove any quotes in the original query, if present. A query in quotes is treated as a single literal by the search engine 104, which returns only documents having the entire query string. This revision increases the number of search results by allowing the search engine 104 to return documents based on the overall relevancy the document to any of the query terms.

Add quotes around the whole query. In some instances, the query is more properly treated as an entire phrase.

Add quotes around query n-grams (some number of successive terms within the query) that are likely to be actual phrases. The identification of an n-gram within the query can be made using a variety of sources:

A) Hand-built dictionary of common phrases.

B) List of phrases built from frequency data. Here, phrases are identified based on sequences of terms that occur together with statistically significant frequency. For instance, a good bi-gram [t1 t2] has the property that if both [t1] and [t2] appear in a document together, with higher than random likelihood, they appear as the bi-gram [t1 t2]. One method for constructing lists of phrases is disclosed in U.S. application Ser. No. 10/900,021, filed Jul. 26, 2004, entitled "Phrase Identification in an Information Retrieval System," which is incorporated by reference herein.

C) Lists of common first names and last names (e.g., obtained from census data or any other source). The syntactical reviser 108.2 determines for each successive pair of query terms [t1 t2] whether [t1] is included in the list of common first names, and [t2] is included in the list of common last names. If so, then the subportion of the query [t1 t2] is placed in quotation marks, to form a potential revised query.

A common problem is the use of stopwords in queries. Ranking algorithms commonly ignore frequent terms such as "the," "a," "an," "to," etc. In some cases, these are actually important terms in the query (consider queries like "to be or not to be"). Accordingly, the syntactical reviser 108.2 also creates a number of revised queries that use the "+" operator (or similar operator) to force inclusion of such terms whenever they are present in the query. For example, for the query [the link], it will suggest [+the link].

Strip punctuation and other symbols. Users occasionally add punctuation or other syntax (such as symbols) that changes the meaning of a query. Since most users who do this do so unintentionally, the syntactical reviser 108.2 also generates revised queries by stripping punctuation and other similar syntax whenever present. For instance, for the query [rear window+movie], the syntactical reviser generates the query [rear window movie], which will prevent the search engine 104 from searching on the character sequence "window+," which is unlikely to produce any results at all.

The refinement reviser 108.3 can use any suitable method that refines, i.e., narrows, the query to more specifically describe the user's potential information need. In one embodiment, the refinement reviser 108.3 generates query revisions by comparing a term vector representation of the search query with the term vectors of known search queries, which have been previously associated and weighted with their respective search results. The known search query (or queries) that have the closest vectors are selected as potential revised queries.

First, this reviser 108.1 can broaden the query by adding synonyms and related terms as disjuncts. Queries are often overly specific because the user happens to choose a particular word to describe a general concept. If the documents of interest do not contain the word, the user's information need remains unfulfilled. Query revisions that add synonyms as disjuncts can broaden the query and bring the desired documents into the result set. Similarly, it is sometimes helpful to add a related word, rather than an actual synonym, as a disjunct. Any suitable method of query broadening, such as related terms, synonyms, thesauruses or dictionaries, or the like may be used here. One method for query broadening is disclosed in U.S. application Ser. No. 11/096,726, filed on Mar. 30, 2005, entitled "Determining Query Term Synonyms Within Query Context," which is incorporated by reference.

Second, this reviser 108.1 can broaden the query by dropping one or more query terms. As an earlier example showed, sometimes dropping a query term (like "information" in the example query "Mitsubishi Gallant information") can result in a good query revision. In this approach, the broadening reviser 108.1 determines which terms of the query are unimportant in that their presence does not significantly improve the search results as compared to their absence. Techniques for identifying unimportant terms for purposes of search are described in U.S. application Ser. No. 11/090,302, filed Mar. 28, 2005, entitled "Determining Query Terms of Little Significance," which is incorporated by reference. The results of such techniques can be used to revise queries by dropping unimportant terms.

Third, the refinement reviser 108.3 computes a cluster centroid for each potential refinement cluster. The refinement reviser 108.3 then determines for each cluster a potential revised query. In a given refinement cluster, for each previously stored search query that is associated with a document in the cluster, the refinement reviser 108.3 scores the stored search query based on its term vector distance to the cluster centroid and the number of stored documents with which the search query is associated. In each potential refinement cluster, the previously stored query that scores the highest is selected as a potential revised query.

Finally, the refinement reviser 108.3 provides the selected revised refinement queries to the revision server 107. The details of one suitable refinement reviser are further described in U.S. patent application Ser. No. 10/668,721, filed on Sep. 22, 2003, entitled "System and Method for Providing Search Query Refinements," which is incorporated by reference herein.

The session-based reviser 108.4 can use any suitable method that uses session-based user data to more correctly capture the user's potential information need based on analysis of changes other users have made in the past. In one embodiment, the session-based reviser 108.4 provides one or more revised queries based on click data collected from many individual user sessions. Initially, a frequency of occurrence for query pairs is calculated using two tables generated by the session-based reviser 108.4. A query pair is a sequence of two queries that occur in a single user session, for example, the first query [sheets], followed by the second query [linens] or the second query [silk sheets]. A first table of recurring individual queries is generated from user session query data, for example stored in the log files 110 of FIG. 1b. In one embodiment, the recurring queries occur with a minimum frequency, for example once per day. A second table of recurring query pairs is also generated from the log files 110, each query pair including a first query that was followed by a second query. From the two tables, the frequency of occurrence of each query pair is calculated as a fraction of the occurrence count for the first query in the first table. For example, if a first query [sheets] occurs 100 times, and is followed by a second query [linens] 30 times out of 100, then the frequency of occurrence of the query pair [sheets, linens], as a fraction of the occurrence count for the first query, is 30/100, or 30%. For any given first query, a query pair is retained, with the second query as a candidate revision for the first query, if the frequency of occurrence exceeds a certain threshold. In one embodiment, the threshold is 1%.

For candidate revised queries, an increase in quality of the second query in the query pair over the first query in the pair is calculated using two additional tables generated by the session-based reviser 108.4 from the user click data. A table of quality scores is generated for each of the queries of the pair. From the table, the improvement, if any, in the quality of the second query in the pair over the first query in the pair, is calculated.

In one embodiment, quality scores are determined by estimating user satisfaction from click behavior data. One such method for determining quality scores is the use of interaction profiles, as described in U.S. application Ser. No. 10/878,926, "Systems and Methods for Deriving and Using an Interaction Profile," filed on Jun. 28, 2004, which is incorporated by reference.

In one embodiment, the quality score calculation is based on user click data stored, for example, in log files 110. Quality scores are based on the estimated duration of a first click on a search result. In one embodiment, the duration of a particular click is estimated from the times at which a first and subsequent click occurred, which may be stored with other user session query data, for example in the log files 110 of FIG. 1b. Scoring includes assigning search results with no click a score of zero, and proceeds along an S-curve applied to the duration between the first click and a subsequent click, with longer clicks approaching a quality score of 1. In one embodiment, 20 seconds corresponds to 0.1, 40 seconds corresponds to 0.5, and 60 seconds corresponds to 0.9. Clicks on unrelated content, for example banner ads, are excluded from the data. In another embodiment, all result clicks for a query, rather than just the first, are collected.

The session-based reviser 108.4 can then calculate an expected utility for the second query as a candidate revised query over a first query using the frequency occurrence and quality score data from above. In one embodiment, the expected utility is the product of the frequency of occurrence of a query pair and the improvement of quality of the second query over the first query in the pair. In this example, an improvement in quality occurs if the quality score for a second query is higher that the quality score for the first query. If the expected utility of the second query exceeds a threshold, the second query is marked as a potential revised query. In one embodiment, the threshold is 0.02, for example, corresponding to a 10% frequency and a 0.2 increase in quality, or a 20% frequency and a 0.1 increase in quality. Other variations of an expected utility calculation can be used as well.

As described above, each revised query can be associated with a confidence measure representing the probability that the revision is a good revision. In the case of the session-based reviser 108.4, the expected utility of a revised query can be used as the confidence measure for that revised query.

An example of query revision using a session-based reviser 108.4 follows. A first user query is [sheets]. Stored data indicates that one commonly user-entered (second) query following [sheets] is [linens] and another commonly entered second query is [silk sheets]. Based on the data stored in the log files 110, the frequency of the query pair [sheets, linens] is 30%, and the frequency of the query pair [sheets, silk sheets] is 1%, as a percentage of occurrences of the first query [sheets]. For example, if the query [sheets] occurred 100 times in the table, [sheets, linens] occurred 30 times and [sheets, silk sheets] occurred once. Assuming a 1% threshold for second queries as candidate revisions, both of these queries would be retained.

Next, data indicates that the quality score for [sheets] is 0.1, whereas quality scores for the second queries [linens] and [silk sheets], respectively, are 0.7 and 0.8. Thus, the improvement in quality for [linens] over [sheets] is 0.6 (0.7-0.1) and the improvement in quality for [silk sheets] over [sheets] is 0.7 (0.8-0.1).

Then, the session-based reviser 108.4 calculates the expected utility of each revision as the product of the frequency score and the improvement in quality. For [sheets, linens] the product of the frequency (30%) and the increase in quality (0.6) yields an expected utility of 0.18. For [sheets, silk sheets] the product of the frequency (1%) and the increase in quality (0.7) yields an expected utility of 0.007. Thus, the second query [linens] has a higher expected utility then the query [silk sheets] for a user who enters a first query [sheets], and hence [linens] is a better query revision suggestion. These expected utilities can be used as the confidence measures for the revised queries as discussed above.

Generating Revision Confidence Measures at Runtime

Figure 1B:
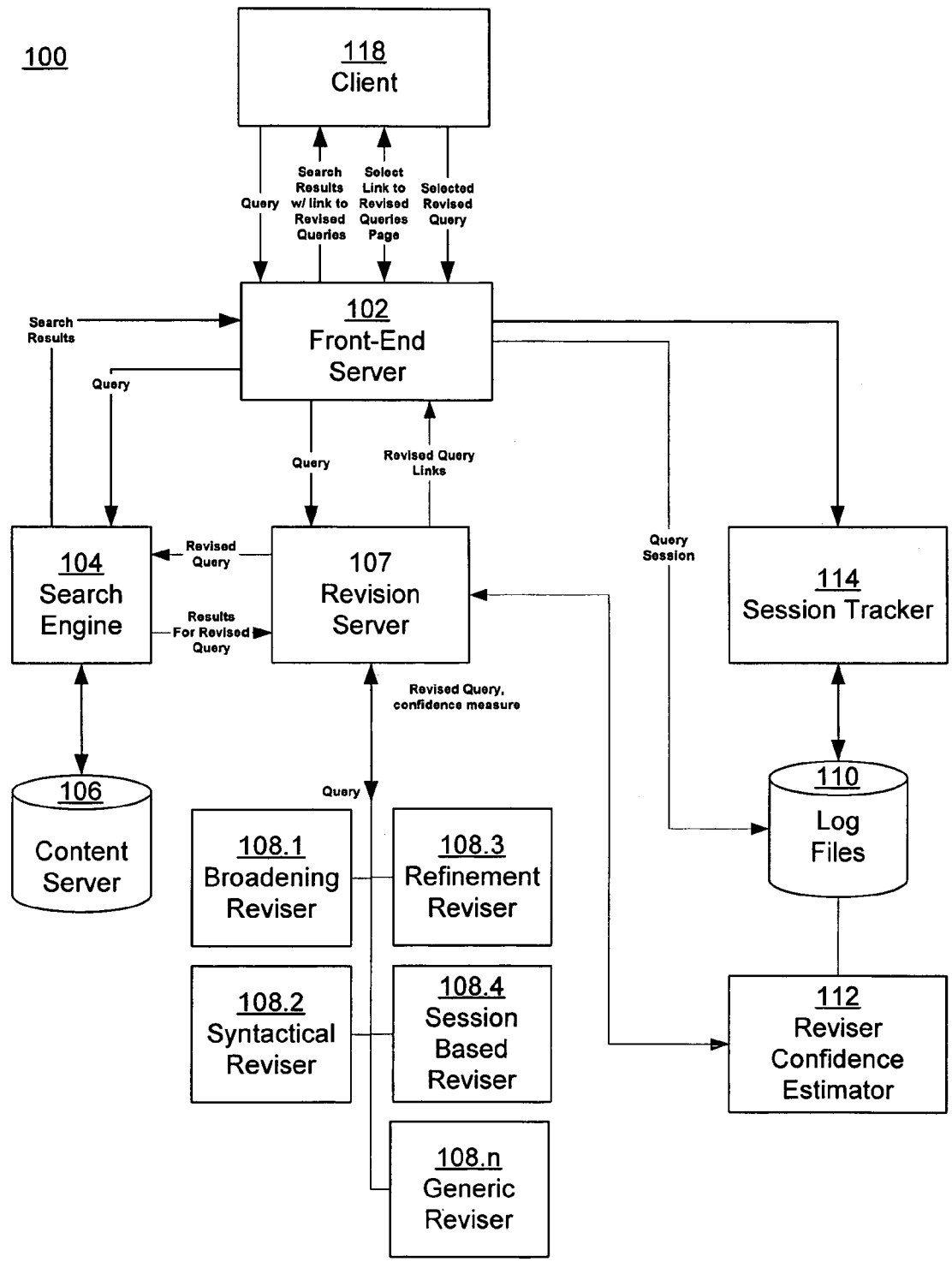
FIG. 1b is an overall system diagram of an alternative information retrieval system.

Referring now to FIG. 1b, there is shown another embodiment of an information retrieval system in accordance with the present invention. In addition to the previously described elements of FIG. 1a, there are log files 110, a session tracker 114, and a reviser confidence estimator 112. As discussed above, a query reviser 108 may provide a confidence measure with one or more of the revised queries that it provides to the revision server 107. The revision server 107 uses the confidence measures to determine which of the possible revised queries to select for inclusion on the revised queries page 300. In one embodiment, confidence measures can be derived at runtime, based at least in part on historical user activity in selecting revised queries with respect to a given original query.

In the embodiment of FIG. 1b, the front-end server 102 provides the session tracker 114 with user click-through behavior, along with the original query and revised query information. The session tracker 114 maintains log files 110 that store each user query in association with which query revision links 302 were accessed by the user, the results associated with each revised query, along with various features of the original query and revised queries for modeling the quality of the revised queries. The stored information can include, for example:

For the original query:
  the original query itself;
  each word in original query;
  length of original query;
  topic cluster of the original query;
  the information retrieval score for the original query; and
  the number of results for the original query.

For a revised query:
the revised query itself;
each word in the revised query;
identification of the revision technique that generated it;
length of revised query;
topic cluster associated with the revised query;
information retrieval score (e.g., page rank) for top search result;
number of results found for revised query;
length of click on revised query link 302; and
length of click on revised query results 304.

Topic clusters for queries are identified using any suitable topic identification method. One suitable method is described in U.S. application Ser. No. 10/676,571, filed on Sep. 30, 2003, entitled "Method and Apparatus for Characterizing Documents Based on Clusters of Related Words," which is incorporated by reference.

The reviser confidence estimator 112 analyzes the log files 110 using a predictive model, e.g., a multiple, logical regression model, to generate a set of rules based on the features of the query and the revised queries that can be used to estimate the likelihood of a revised query being a successful revision for a given query. One suitable regression model is described in U.S. application Ser. No. 10/734,584, filed Dec. 15, 2003, entitled "Large Scale Machine Learning Systems and Methods," which is incorporated by reference. The reviser confidence estimator 112 operates on the assumption that a long click by a user on a revised query link 302 indicates that the user is satisfied with the revision as being an accurate representation of the user's original information need. A long click can be deemed to occur when the user stays on the clicked through page for some minimum period of time, for example a minimum of 60 seconds. From the length of the clicks on the revised query links 302, the reviser confidence estimator 112 can train the predictive model to predict the likelihood of a long click given the various features of the revised query and the original query. Revised queries having high predicted likelihoods of a long click are considered to be better (i.e., more successful) revisions for their associated original queries.

In one embodiment for a predictive model the confidence estimator 112 selects features associated with the revised queries, collects click data from the log files, formulates rules using the features and click data, and adds the rules to the predictive model. In addition, the confidence estimator 112 can formulate additional rules using the click data and selectively add the additional rules to the model.

At runtime, the revision server 107 provides the reviser confidence estimator 112 with the original query, and each of the revised queries received from the various query revisers 108. The reviser confidence estimator 112 applies the original query and revised queries to the predictive model to obtain the prediction measures, which serve as the previously mentioned confidence measures. Alternatively, each query reviser 108 can directly call the reviser confidence estimator 112 to obtain the prediction measures, and then pass these values back to the revision server 107. Although the depicted embodiment shows the reviser confidence estimator 112 as a separate module, the revision server 107 may provide the confidence estimator functionality instead. In either case, the revision server 107 uses the confidence measures, as described above, to select and order which revised queries will be shown to the user.

In one embodiment, revision server 107 uses the confidence measures to determine whether to show query revisions at all, and if so, how prominently to place the revisions or the link thereto. To do so, the revision server 107 may use either the initial confidence measures discussed previously or the dynamically generated confidence measures discussed above. For example, if the best confidence measure falls below a threshold value, this can indicate that none of the potential candidate revisions is very good, in which case no modification is made to the original result page 200. On the other hand, if one or more of the revised queries has a very high confidence measure above another threshold value, the revision server 107 can force the query revisions, or the link to the revised query page 300, to be shown very prominently on the original result page 200, for example, near the top of page and in a distinctive font, or in some other prominent position. If the confidence measures are in between the two thresholds, then a link to the revised query page 300 can be placed in a less prominent position, for example at the end of the search results page 200, e.g., as shown for link 206.

The steps of the processes described above can performed in parallel (e.g., getting results for a query revision and calculating a confidence measure for the query revision), and/or interleaved (e.g., receiving multiple query revisions from the query revisers and constructing a sorted list of query revisions on-the-fly, rather than receiving all the query revisions and then sorting the list of query revisions). In addition, although the embodiments above are described in the context of a client/server search system, the invention can also be implemented as part of a stand-alone machine (e.g., a stand-alone PC). This could be useful, for example, in the context of a desktop search application such as Google Desktop Search.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description the described actions and processes are those of a computer system, or similar electronic computing device, that manipulates and transforms data represented as physical (electronic) quantities within the computer system memories or registers or other such information storage, transmission, or display devices. A detailed description of the underlying hardware of such computer systems is not provided herein as this information is commonly known to those of skill in the art of computer engineering.

Certain aspects of the present invention include process steps and instructions described herein in the form of an algorithm. It should be noted that the process steps and instructions of the present invention could be embodied in software, firmware, or hardware, and when embodied in software, could be downloaded to reside on and be operated from different platforms used by real time network operating systems.

Certain aspects of the present invention have been described with respect to individual or singular examples; however it is understood that the operation of the present invention is not limited in this regard. Accordingly, all references to a singular element or component should be interpreted to refer to plural such components as well. Likewise, references to "a," "an," or "the" should be interpreted to include reference to pluralities, unless expressed stated otherwise. Finally, use of the term "plurality" is meant to refer to two or more entities, items of data, or the like, as appropriate for the portion of the invention under discussion, and does cover an infinite or otherwise excessive number of items.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus. Those of skill in the art of integrated circuit design and video codecs appreciate that the invention can be readily fabricated in various types of integrated circuits based on the above functional and structural descriptions, including application specific integrated circuits (ASICs). In addition, the present invention may be incorporated into various types of video coding devices.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method comprising:

receiving an original query term from a user;

identifying commonly entered query terms from session data, the session data including a record of each of multiple past sessions of search activity by multiple different other users, each past session including a sequence of queries executed by a respective other user, each commonly entered query term being a query term occurring in a query after the original query term occurs in an earlier query in at least one of the past sessions of the other users;

determining, by one or more processors, a frequency of occurrence of each commonly entered query term in the past sessions as a successor query term to the original query term;

retaining one or more candidate query terms, the candidate query terms being the commonly entered query terms whose frequency of occurrence as the successor query term satisfies a first threshold;

determining a quality score of the original query term and of each of the candidate query terms based on user click data which specifies an extent to which, in the past sessions, the other users interacted with (i) a search result resulting from executing the queries using the original query term and (ii) a search result resulting from executing the queries using the candidate query terms;

retaining one or more improved query terms, each improved query term being the candidate query term having a quality score that exceeds the quality score of the original query term;

determining an expected utility for each improved query term based on multiplying a difference, in the quality score of the improved query terms over the quality score of the original query term, by the frequency of occurrence of the improved query term as the successor query term; and providing a link to second search results, each of the second search results being associated with one or more of the improved query terms, and each of the second search results being associated with at least a portion of the improved query terms having the expected utility that satisfies a second threshold.

2. The method of claim 1, wherein determining the frequency of occurrence of each commonly entered query term further comprises:

accessing a table which stores pairs of queries which have recurred, in sequence, in excess of a minimum frequency, in the past sessions.

3. The method of claim 1, wherein the first threshold is 1%.

4. The method of claim 1, wherein determining the quality score of each of the candidate query terms further comprises:

assigning a quality score of 0 to a first search result which received no initial click;

applying a duration of an initial click on a second search result to an S-curve; and assigning a positive quality score to the second search result based on applying the duration to the S-curve.

5. The method of claim 1, wherein:

determining the quality score further comprises determining, from the session data, a duration of each initial click, by the other users in the past sessions, on each search result resulting from executing the queries using the original query term and on each search result resulting from executing the queries using the candidate query terms; and for the original query term and for each of the candidate query terms, the quality score is based on the respective durations of the initial clicks on the respective search results resulting from executing the respective query terms.

6. The method of claim 5, wherein determining the duration of the subsequent click further comprises identifying as the subsequent click a click that did not select a banner ad.

7. The method of claim 5, further comprising:
storing a time when each initial click occurred and a time when a corresponding subsequent click occurred,
wherein determining the duration of the initial click comprises subtracting the time of occurrence of each initial click from the time of occurrence of the corresponding subsequent click.

8. The method of claim 1, wherein the quality score is expressed as a number between 0 and 1, inclusive.

9. The method of claim 1, wherein the second threshold is 0.02.

10. A system comprising:
one or more computers; and
a computer-readable medium coupled to the one or more computers having instructions stored thereon which, when executed by the one or more computers, cause the one or more computers to perform operations comprising:
receiving an original query term from a user,
identifying commonly entered query terms from session data, the session data including a record of each of multiple past sessions of search activity by multiple different other users, each past session including a sequence of queries executed by a respective other user, each commonly entered query term being a query term occurring in a query after the original query term occurs in an earlier query in at least one of the past sessions of the other users,
determining a frequency of occurrence of each commonly entered query term in the past sessions as a successor query term to the original query term,
retaining one or more candidate query terms, the candidate query terms being the commonly entered query terms whose frequency of occurrence as the successor term satisfies a first threshold,
determining a quality score of the original query term and of each of the candidate query terms based on user click data which specifies an extent to which, in the past sessions, the other users interacted with (i) a search result resulting from executing the queries using the original query term and (ii) a search result resulting from executing the queries using the candidate query terms,
retaining one or more improved query terms, each improved query term being the candidate query term having a quality score that exceeds the quality score of the original query term,
determining an expected utility for each improved query term based on multiplying a difference, in the quality score of the improved query terms over the quality score of the original query term, by the frequency of occurrence of the improved query term as the successor query term; and
providing a link to second search results, each of the second search results being associated with one or more of the improved query terms, and each of the second search results being associated with at least a portion of the improved query terms having the expected utility that satisfies a second threshold.

11. The system of claim 10, wherein determining the frequency of occurrence of each commonly entered query term further comprises:
accessing a table which stores pairs of queries which have recurred, in sequence, in excess of a minimum frequency, in the past sessions.

12. The system of claim 10, wherein determining the quality score of each of the candidate query terms further comprises:
assigning a quality score of 0 to a first search result which received no initial click;
applying a duration of an initial click on a second search result to an S-curve; and
assigning a positive quality score to the second search result based on applying the duration to the S-curve.

13. The system of claim 10, wherein:
determining the quality score further comprises determining, from the session data, a duration of each initial click, by the other users in the past sessions, on each search result resulting from executing the queries using the original query term and on each search result resulting from executing the queries using the candidate query terms; and
for the original query term and for each of the candidate query terms, the quality score is based on the respective durations of the initial clicks on the respective search results resulting from executing the respective query terms.

14. A computer storage medium encoded with a computer program, the program comprising instructions that when executed by data processing apparatus cause the data processing apparatus to perform operations comprising:
receiving an original query term from a user;
identifying commonly entered query terms from session data, the session data including a record of each of multiple past sessions of search activity by multiple different other users, each past session including a sequence of queries executed by a respective other user, each commonly entered query term being a query term occurring in a query after the original query term occurs in an earlier query in at least one of the past sessions of the other users;
determining a frequency of occurrence of each commonly entered query term in the past sessions as the successor query term to the original query term;
retaining one or more candidate query terms, the candidate query terms being the commonly entered query terms whose frequency of occurrence as the successor query term satisfies a first threshold;
determining a quality score of the original query term and of each of the candidate query terms based on user click data which specifies an extent to which, in the past sessions, the other users interacted with (i) a search result resulting from executing the queries using the original query term and (ii) a search result resulting from executing the queries using the candidate query terms;
retaining one or more improved query terms, each improved query term being the candidate query term having a quality score that exceeds the quality score of the original query term; and
determining an expected utility for each improved query term based on multiplying a difference, in the quality score of the improved query terms over the quality score of the original query term, by the frequency of occurrence of the improved query term as the successor query term; and
providing a link to second search results, each of the second search results being associated with one or more of the improved query terms, and each of the second search results being associated with at least a portion of the improved query terms having the expected utility that satisfies a second threshold.

15. The computer storage medium of claim 14, wherein determining the frequency of occurrence of each commonly entered query term further comprises:

accessing a table which stores pairs of queries which have recurred, in sequence, in excess of a minimum frequency, in the past sessions.

16. The computer storage medium of claim 14, wherein determining the quality score of each of the candidate query terms further comprises:

assigning a quality score of 0 to a first search result which received no initial click;

applying a duration of an initial click on a second search result to an S-curve; and assigning a positive quality score to the second search result based on applying the duration to the S-curve.

17. The computer storage medium of claim 14, wherein:

determining the quality score further comprises determining, from the session data, a duration of each initial click, by the other users in the past sessions, on each search result resulting from executing the queries using the original query term and on each search result resulting from executing the queries using the candidate query terms; and for the original query term and for each of the candidate query terms, the quality score is based on the respective durations of the initial clicks on the respective search results resulting from executing the respective query terms.

* * * * *

UNITED STATES PATENT AND TRADEMARK OFFICE
CERTIFICATE OF CORRECTION

PATENT NO. : 7,617,205 B2 Page 1 of 1
APPLICATION NO. : 11/096198
DATED : November 10, 2009
INVENTOR(S) : David R. Bailey It is certified that error appears in the above-identified patent and that said Letters Patent is hereby corrected as shown below:

In column 15, line 3, in claim 6, after "click" delete "a click".

In column 16, line 57, in claim 14, after "term;" delete "and".

Signed and Sealed this

Twenty-fifth Day of May, 2010

David J. Kappos
*Director of the United States Patent and Trademark Office*